United States Patent
Ghaffarzadegan et al.

(10) Patent No.: US 11,830,239 B1
(45) Date of Patent: *Nov. 28, 2023

(54) SYSTEMS AND METHODS FOR AUTOMATIC EXTRACTION AND ALIGNMENT OF LABELS DERIVED FROM CAMERA FEED FOR MOVING SOUND SOURCES RECORDED WITH A MICROPHONE ARRAY

(71) Applicant: Robert Bosch GmbH, Stuttgart (DE)

(72) Inventors: Shabnam Ghaffarzadegan, Livermore, CA (US); Samarjit Das, Wexford, PA (US); Luca Bondi, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,532

(22) Filed: Jul. 13, 2022

(51) Int. Cl.
| | |
|---|---|
| *G06V 10/774* | (2022.01) |
| *G10L 25/24* | (2013.01) |
| *H04R 1/40* | (2006.01) |
| *G06V 20/40* | (2022.01) |
| *G06T 7/20* | (2017.01) |
| *G10L 25/57* | (2013.01) |
| *G10L 25/30* | (2013.01) |

(52) U.S. Cl.
CPC ............. *G06V 10/774* (2022.01); *G06T 7/20* (2013.01); *G06V 20/40* (2022.01); *G10L 25/24* (2013.01); *G10L 25/30* (2013.01); *G10L 25/57* (2013.01); *H04R 1/406* (2013.01); *G06T 2207/10016* (2013.01)

(58) Field of Classification Search
CPC .................................................. G06V 10/774
See application file for complete search history.

(56) References Cited

U.S. PATENT DOCUMENTS

| | | | |
|---|---|---|---|
| 2013/0272548 A1 | 10/2013 | Visser et al. | |
| 2020/0241552 A1 | 7/2020 | Leenayongwut et al. | |
| 2021/0065733 A1 | 3/2021 | Sallem et al. | |
| 2021/0103747 A1* | 4/2021 | Moustafa | G06F 18/25 |

(Continued)

FOREIGN PATENT DOCUMENTS

CN 112183729 A 1/2021

OTHER PUBLICATIONS

Takahashi et al: "Deep Convolutional Neural Networks and Data Augmentation for Acoustic Even Detection", Dec. 8, 2016.

(Continued)

*Primary Examiner* — Olisa Anwah
(74) *Attorney, Agent, or Firm* — Dickinson Wright PLLC

(57) ABSTRACT

A method for labeling audio data includes receiving video stream data and audio stream data that corresponds to at least a portion of the video stream data. The method also includes labeling, at least some objects of the video stream data. The method also includes calculating at least one offset value for at least a portion of the audio stream data that corresponds to at least one labeled object of the video stream data. The method also includes synchronizing at least a portion of the video stream data with the portion of the audio stream data. The method also includes labeling at least the portion of the audio stream data that corresponds to the at least one labeled object of the video stream data and generating training data using at least some of the labeled portion of the audio stream data.

20 Claims, 10 Drawing Sheets

(56) References Cited

U.S. PATENT DOCUMENTS

2021/0136510 A1    5/2021   Tang et al.
2021/0289168 A1    9/2021   Gluckert et al.
2021/0383800 A1*  12/2021   Pair ........................ G10L 15/22
2022/0027672 A1    1/2022   Xu et al.
2022/0101855 A1*   3/2022   Thomas, III ........... H04N 7/147

OTHER PUBLICATIONS

Li et al: "Learning to Self-Train for Semi-Supervised Few-Shot Classification Tat-Seng Chua", Sep. 29, 2019.

Yu et al: "Few-Shot Sound Event Detection", 2020 IEEE International Conference on Acoustics, Speech and Signal Processing (ICASSP), IEEE, May 4, 2020.

Li Juncheng et al.: "A Light-Weight Multimodal Framework for Improved Environmental Audio Tagging", 2018 IEEE International Conference On Acoustics, Speech and Signal Processing (ICASSP), IEEE, Apr. 15, 2018, pp. 6832-6836, XP0033401743, DOI: 10.1109/ICASSP.2018.8462479.

* cited by examiner

US 11,830,239 B1

SYSTEMS AND METHODS FOR AUTOMATIC EXTRACTION AND ALIGNMENT OF LABELS DERIVED FROM CAMERA FEED FOR MOVING SOUND SOURCES RECORDED WITH A MICROPHONE ARRAY

TECHNICAL FIELD

The present disclosure relates to computer systems that have capability for artificial intelligence, including neural networks. In embodiments, this disclosure relates to automatic extraction and alignment of labels derived from video data for moving sound sources recorded with an audio capturing array.

BACKGROUND

In development of data for training machine-learning models, data collection and labeling, particularly sound data, is a laborious, costly, and time-consuming venture, which may represent a major bottleneck in most current machine-learning pipelines. Humans use a variety of sound cues from an environment in everyday life decision making. Increasingly, developers are attempting to incorporate such decision making in various machine-learning models. While techniques for using a machine-learning model to understand human speech is relatively ubiquitous, using a machine-learning model to understand non-speech environmental sounds is a comparably younger field and a fast-growing topic of interest.

SUMMARY

An aspect of the disclosed embodiments includes a method for generating training data. The method includes receiving, audio stream data associated with at least one audio capturing array disposed in a data capture environment, receiving video stream data associated with the data capture environment contemporaneous with the audio stream data, the video stream data being associated with at least one image capturing array that is disposed in the data capture environment at a distance from the at least one audio capturing array, and identifying, using output from at least a first machine learning model configured to provide output including one or more object detection predictions, one or more objects in the video stream data. The method also includes, for at least one object of the one or more objects identified in the video stream data, identifying, using output form a probability-based audio event detector, a portion of the audio stream data that corresponds to the at least one object. The method also includes calculating, based on at least one data capturing characteristic, at least one offset value for at least a portion of the audio stream data that corresponds to at least one labeled object of the video stream data, and computing, for the at least one object, a shift value based on a cross-correlation between a portion of the video stream data that corresponds to the at least one object and the portion of the audio stream data corresponding the at least one object. The method also includes synchronizing, using at least the at least one offset value and the shift value, the portion of the video stream data that corresponds to the at least one objection with the portion of the audio stream data that corresponds to the at least one object and labeling at least the portion of the audio stream data that corresponds to the at least one object using one or more labels extracted for respective objects of the video stream data, the at least one offset value, and the shift value. The method also includes generating training data using at least one of the labeled portion of the audio stream data.

Another aspect of the disclosed embodiments includes a system for training an audio recognition machine learning model. The system includes a processor and a memory. The memory includes instructions that, when executed by the processor, cause the processor to: receive, audio stream data associated with at least one audio capturing array disposed in a data capture environment; receive video stream data associated with the data capture environment contemporaneous with the audio stream data, the video stream data being associated with at least one image capturing array that is disposed in the data capture environment at a distance from the at least one audio capturing array; identify, using output from at least a first machine learning model configured to provide output including one or more object detection predictions, one or more objects in the video stream data; for at least one object of the one or more objects identified in the video stream data, identify, using output form a probability-based audio event detector, a portion of the audio stream data that corresponds to the at least one object; calculate, based on at least one data capturing characteristic, at least one offset value for at least a portion of the audio stream data that corresponds to at least one labeled object of the video stream data; compute, for the at least one object, a shift value based on a cross-correlation between a portion of the video stream data that corresponds to the at least one object and the portion of the audio stream data corresponding the at least one object; synchronize, using at least the at least one offset value and the shift value, the portion of the video stream data that corresponds to the at least one objection with the portion of the audio stream data that corresponds to the at least one object; label at least the portion of the audio stream data that corresponds to the at least one object using one or more labels extracted for respective objects of the video stream data, the at least one offset value, and the shift value; generate training data using at least one of the labeled portion of the audio stream data; and train an audio recognition machine learning model using the training data.

Another aspect of the disclosed embodiments includes an apparatus for training an audio recognition machine learning model. The apparatus includes a processor and a memory. The memory includes instructions that, when executed by the processor, cause the processor to: receive, audio stream data associated with at least one audio capturing device disposed in a data capture environment; receive video stream data associated with the data capture environment contemporaneous with the audio stream data, the video stream data being associated with at least one image capturing device that is disposed in the data capture environment at a distance from the at least one audio capturing device; identify, using output from at least a first machine learning model configured to provide output including one or more object detection predictions, one or more objects in the video stream data; for at least one object of the one or more objects identified in the video stream data, identify, using output form a probability-based audio event detector, a portion of the audio stream data that corresponds to the at least one object; calculate, based on at least one data capturing characteristic, at least one offset value for at least a portion of the audio stream data that corresponds to at least one labeled object of the video stream data; compute, for the at least one object, a shift value based on a cross-correlation between a portion of the video stream data that corresponds to the at least one object and the portion of the audio stream data corresponding the at least one object; synchronize, using at least the at least one offset value and the shift value, the portion of the video stream data that corresponds to the at least one objection with the portion of the audio stream data that corresponds to the at least one object; label at least the portion of the audio stream data that corresponds to the at least one object using one or more labels extracted for respective objects of the video stream data, the at least one offset value, and the shift value; generate training data using at least one of the labeled portion of the audio stream data; and train an audio recognition machine learning model using the training data, the audio recognition machine learning model, having been trained using the training data, being configured to detect one or more events in audio stream data provided as input to the audio recognition machine learning model.

DETAILED DESCRIPTION

Figure 1:
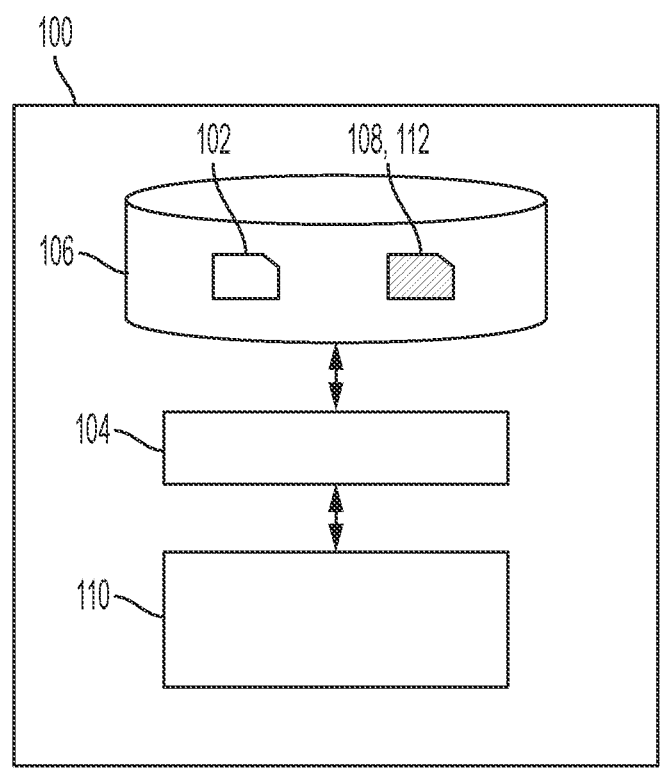
FIG. 1 generally illustrates a system for training a neural network, according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, in development of data for training machine-learning models, data collection and labeling, particularly sound data, is a laborious, costly, and time-consuming venture, which may represent a major bottleneck in most current machine-learning pipelines. Humans use a variety of sound cues from an environment in everyday life decision making. Increasingly, developers are attempting to incorporate such decision making in various machine-learning models. While techniques for using a machine-learning model to understand human speech is relatively ubiquitous, using a machine-learning model to understand non-speech environmental sounds is a comparably younger field and a fast-growing topic of interest.

Most recent advancements in deep learning technology for vision and text come from the access to a large amount of labeled data. However, collecting and strongly labeling audio data (e.g., including labeling an event type as well as a start and an end of the event in an audio sample) may be relatively difficult. Audio data collection in general is a challenging task, due to a substantially unlimited audio vocabulary in real-world scenarios, which may render it essentially impossible to predict the lexicon of a given task.

Unlike spoken words that use a limited set of alphabets, variations in environmental sounds are unlimited. As a result, collecting specific sounds in a pre-set environment is not realistic. Hence, most audio data collection is captured in a continuous setting, and later, human annotators extract and label the desired audio events. Such labeling may be relatively time consuming (e.g., because the annotators may listen to hours of data to find the events of interest or target events). Further, after finding the target events, accurately labeling the start and the end of an audio event may be noisy and subjective due to the transient nature of the signal that typically lacks sharp boundaries.

Another common way to collect audio data is using available data (e.g., from various public sources). However, such data is typically of a low quality, and associated labels for such data may often be created automatically using the title of the audio or video file associated with the data. These labels are sometimes noisy and, typically, are weak labels (e.g., a section of the audio file is labeled as an audio event, but the exact time boundaries of the event are not specified). This typically poses a number of challenges for traditional machine-learning and deep-learning models training.

Accordingly, systems and methods, such as those described herein, configured to pair audio data collection with a video stream and incorporate the advancements in vision domain to automatically label audio data, may be desirable. In some embodiments, the systems and methods described herein may be configured to collect and annotate moving sound sources using an audio capturing array, such as a microphone array or other suitable audio capturing array or device.

In some embodiments, the systems and methods described herein may be configured to use a tandem video capturing device (e.g., a camera or other suitable image capturing device) data and audio capturing array data collection. The systems and methods described herein may be configured to automatically label the moving sources appearing in the video data. The systems and methods described herein may be configured to incorporate a signal-processing based approach to synchronize the collected audio and video data. The systems and methods described herein may be configured to extract the corresponding audio labels. The systems and methods described herein may be configured to use any suitable combination of microphone array and other sensors that would provide automatic labeling for moving sound sources.

In some embodiments, the systems and methods described herein may be configured to collect both audio and video stream data from a data capturing or collection environment. The systems and methods described herein may be configured to use pre-trained object recognition models to automatically label and track objects in the video stream data, and to label corresponding audio data.

The systems and methods described herein may be configured to, based on a positioning of the image capturing device with respect to the audio capturing array and based on a field of view of the image capturing device, identify misalignment between audio and video stream data. The systems and methods described herein may be configured to map the video labels to the audio data based on a time shift between the image capturing device and the audio capturing array. In some embodiments, the systems and methods described herein may be configured to manually observe one or more samples of the audio data and the video data to identify the time shift (e.g., assuming the time shift is constant).

Additionally, or alternatively, in response to the time shift between the image capturing device and the audio capturing array not being constant, (e.g., due to the image capturing device viewpoint, the speed of the object, the travelling direction of the object, drift between asynchronous audio and video collection systems, and the like) the systems and methods described herein may be configured to use a probabilistic based approach to automatically align object labels extracted from the video stream data to the audio stream data.

The systems and methods described herein may be configured to label moving sound events that accompany visual cues/actions. The systems and methods described herein may be configured to extract the direction of a moving object from the video stream data. The systems and methods described herein may be configured to use the extracted direction of the moving object as a label for audio event localization and direction of arrival estimation (e.g., the task of detecting the location of the sound and relatively direction of the sound). In some embodiments, the systems and methods described herein may be configured to provide an initial labeling prediction and receive further annotation from a user.

As described, the systems and methods described herein may be configured to use a probabilistic based approach to automatically align object labels extracted from the video stream data to the audio stream data. As image capturing devices and audio capturing devices do not typically share the same clock (e.g., two separate devices), the systems and methods described herein may be configured to perform synchronization between the object labels extracted from the video stream data and the sound events recorded by the audio capturing array. Such synchronization may be particularly challenging when the field of view of the image capturing device is such that the maximum sound intensity for a specific event occurs when the object is not centered in a video frame, as objects moving toward different directions present different offsets between the label extracted from video stream data and the sound event as recorded in the audio stream data.

In some embodiments, given a list of automatically detected objects from the video stream data, where each object $v=(t_s,t_e,d,l)$ is characterized by a start time $t_s$, an end time $t_e$, a label l, and a direction d (left to right, right to left), for each object, the systems and methods described herein may be configured to compute a central time as:

$$t_c = t_s + \frac{t_e - t_s}{2}$$

The systems and methods described herein may be configured to load $y_a(t)$, $t \in [t_c-\delta, t_c+\delta]$, i.e. the audio stream data between $t_c-\delta$ and $t_e+\delta$, where $\delta$ is a margin large enough such that the sound of the specific object is audible.

The systems and methods described herein may be configured to compute $L_a(t,l,d)$, the likelihood over time of an object with label l and direction d being present in $y_a(t)$. For example, the systems and methods described herein may be configured to compute the likelihood function $L_a(t,l,d)$ when $y_a(t)$ is a collection of signals from the audio capturing array, by: filtering $y_a(t)$ to preserve only the bandwidth of interest for the specific type of sound event l; extracting, potentially overlapping, time windows from $y_a(t)$; and for each window, computing the response of a beamforming algorithm steered toward a predefined set of angles. Given $N_a$ angles and $N_t$ time windows this leads to a Direction-of-Arrival (DoA) map $D \in R^{N_a \times N_t}$, where each element $D(i,j)$, $i \in [1,N_a]$, $j \in [1, N_t]$ represents the energy from the i-th angle in the j-th time window.

The systems and methods described herein may be configured to execute a beamforming algorithm that receives, as input, the signals recorded by the audio capturing array and a steering direction. The systems and methods described herein may be configured to compute the acoustic energy associated with such direction. For example, a beamforming algorithm steered toward α (e.g., an angle between the audio capturing array 304 and a first object such as a first vehicle 308) or β (e.g., an angle between the audio capturing array 304 and a second objection, such as a second vehicle 310) will show higher energy than when steered toward other directions, as illustrated in FIG. 3B.

The systems and methods described herein may be configured to, based on direction d, select a pre-defined DoA template, (e.g., a matrix $P \in R^{N_a \times N_p}$, where $N_p$ is the number of time windows spanned by the template). Each element $P(i,j)$, $i \in [1,N_a]$, $j \in [1,N_p]$ represents the energy from the i-th angle in the j-th time window. $L_a(t,l,d) \in R^{N_t-N_p+1}$ results from the 2D cross-correlation (pattern matching) between D and P, which may be defined as:

$$L_a(t, l, d) = \sum_{i=1}^{N_a} \sum_{j=1}^{N_p} P(i, j) \cdot D(i, t+j), t \in [1, N_t - N_p + 1]$$

The systems and methods described herein may be configured to provide pattern matching, where a minimum family of patterns P includes two patterns, one for sound objects travelling left to right, one for the sound objects travelling right to left. The systems and methods described herein may be configured to determine the time $t_p$ where $L_a(t,l,d)$ is maximum. The offset between the video object and the corresponding sound event is $t_p-t_c$.

In some embodiments, the systems and methods described herein may be configured to incorporate a video object detection model in the video stream data to automatically label the corresponding moving sound sources that accompany visual cues/actions. The systems and methods described herein may be configured to incorporate the video object detection model to extract a trajectory of moving sound sources. The systems and methods described herein may be configured to use a probabilistic-based approach to automatically synchronize isolated moving sound events with the corresponding labels from the video object detection model. The systems and methods described herein may be configured to us any other sensors for automatically label moving sound sources. The systems and methods described herein may be configured to provide data synchronization to align the labels generated with different sensors.

In some embodiments, the systems and methods described herein may be configured to receive, from at least one image capturing device (e.g., such as a camera or other suitable image capturing device), video stream data associated with a data capture environment. It should be understood that the systems and methods described herein may be configured to use any suitable number of image capturing devices.

The systems and methods described herein may be configured to receive, from at least one audio capturing array (e.g., such as one or more microphones or one or more other suitable audio capturing arrays or device), audio stream data that corresponds to at least a portion of the video stream data. The at least one audio capturing array is remotely located from the at least one image capturing device, or proximately located to the at least one image capturing device. The systems and methods described herein may be configured to label, using output from at least a first machine-learning model configured to provide output including one or more object detection predictions, at least some objects of the video stream data.

The systems and methods described herein may be configured to calculate (e.g., using at least one probabilistic-based function or other suitable technique or function), based on at least one data capturing characteristic, at least one offset value for at least a portion of the audio stream data that corresponds to at least one labeled object of the video stream data. The systems and methods described herein may be configured to synchronize (e.g., aligning video objects of the video stream data with corresponding audio events of the audio stream data), using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The systems and methods described herein may be configured to label, using one or more labels of the labeled objects of the video stream data and the at least one offset value, at least the portion of the audio stream data that corresponds to the at least one labeled object of the video stream data. Each respective label may include an event type, an event start indicator, and an event end indicator. The systems and methods described herein may be configured to generate training data using at least some of the labeled portion of the audio stream data. The systems and methods described herein may be configured to train a second machine-learning model using the training data. The systems and methods described herein may be configured to detect, using the second machine-learning model, one or more sound associated with audio data provided as input to the second machine-learning model.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input and output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
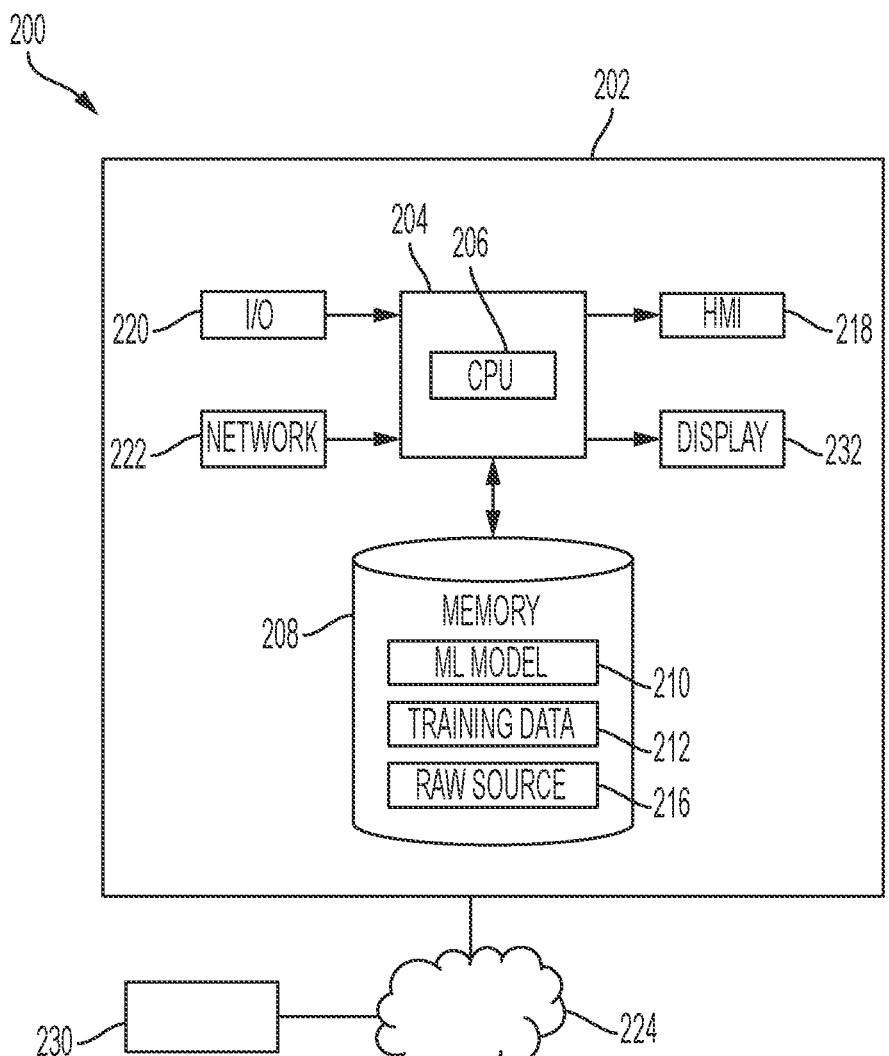
FIG. 2 generally illustrates a computer-implemented method for training and utilizing a neural network, according the principles of the present disclosure.

FIG. 2 depicts a data annotation/augmentation system 200 to implement a system for annotating and/or augment data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, and raw or partially processed sensor data (e.g., radar map of objects). In some embodiments, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., pedestrian). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In the example, the machine-learning algorithm 210 may process raw source data 216 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3A:
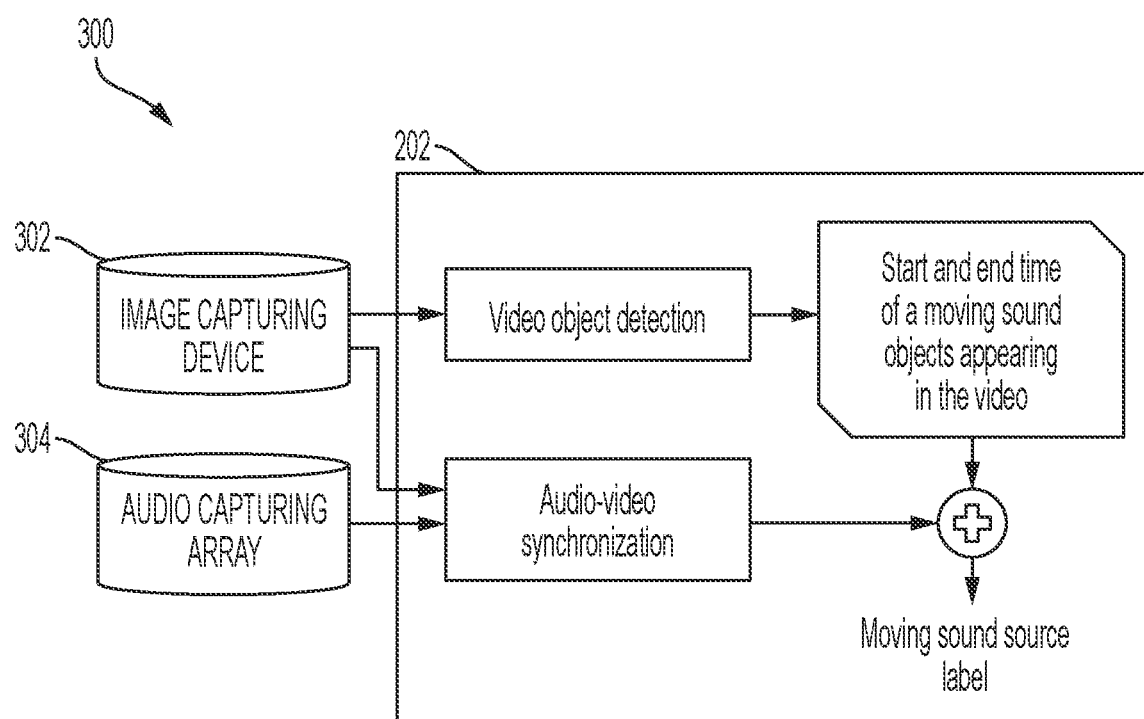
FIGS. 3A-3B generally illustrate an audio data labeling system, according to the principles of the present disclosure.
Figure 3B:
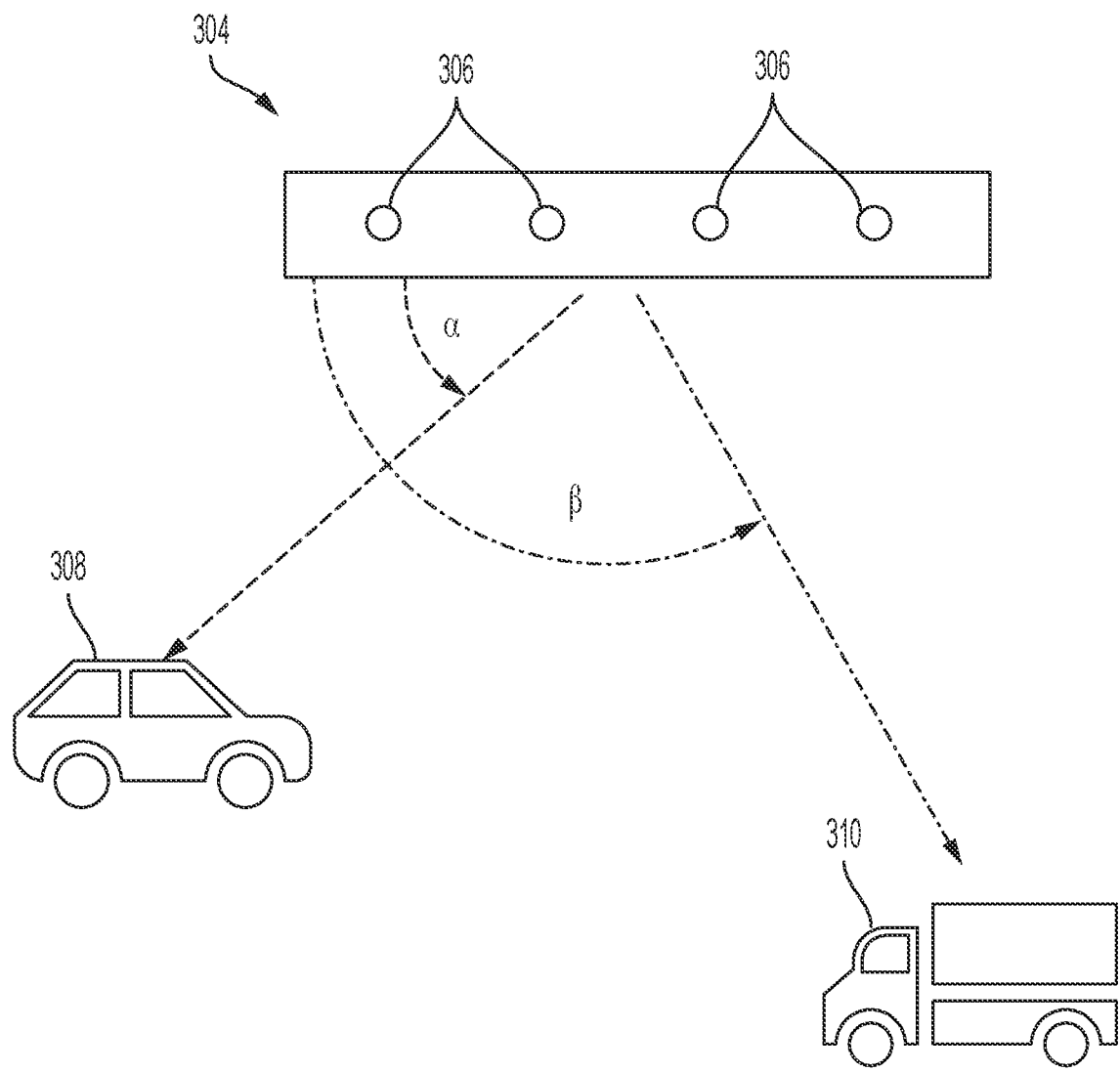

As is generally illustrated in FIGS. 3A and 3B, a system 300 may include an image capturing device 302, an audio capturing array 304, and the computing system 202. The system 202 may receive, from the image capturing device 302, video stream data associated with a data capture environment. The system 202 may be configured to perform video object detection to identify one or more objects in corresponding images of the video stream data. The system 202 may receive, from the audio capturing array 304, audio stream data that corresponds to at least a portion of the video stream data. The audio capturing array 304 may include one or more microphones 306 or other suitable audio capturing devices. The systems and methods described herein may be configured to label, using output from at least a first machine-learning model (e.g., such as the machine-learning model 210 or other suitable machine-learning model) configured to provide output including one or more object detection predictions, at least some objects of the video stream data.

The system 202 may calculate (e.g., using at least one probabilistic-based function or other suitable technique or function), based on at least one data capturing characteristic, at least one offset value for at least a portion of the audio stream data that corresponds to at least one labeled object of the video stream data. The system 202 may synchronize, using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The system 202 may label, using one or more labels of the labeled objects of the video stream data and the at least one offset value, at least the portion of the audio stream data that corresponds to the at least one labeled object of the video stream data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sound associated with audio data provided as input to the second machine-learning model. The second machine-learning model may include any suitable machine-learning model and may be configured to perform any suitable function, such as those described herein with respect to FIGS. 6-11.

Figure 4:
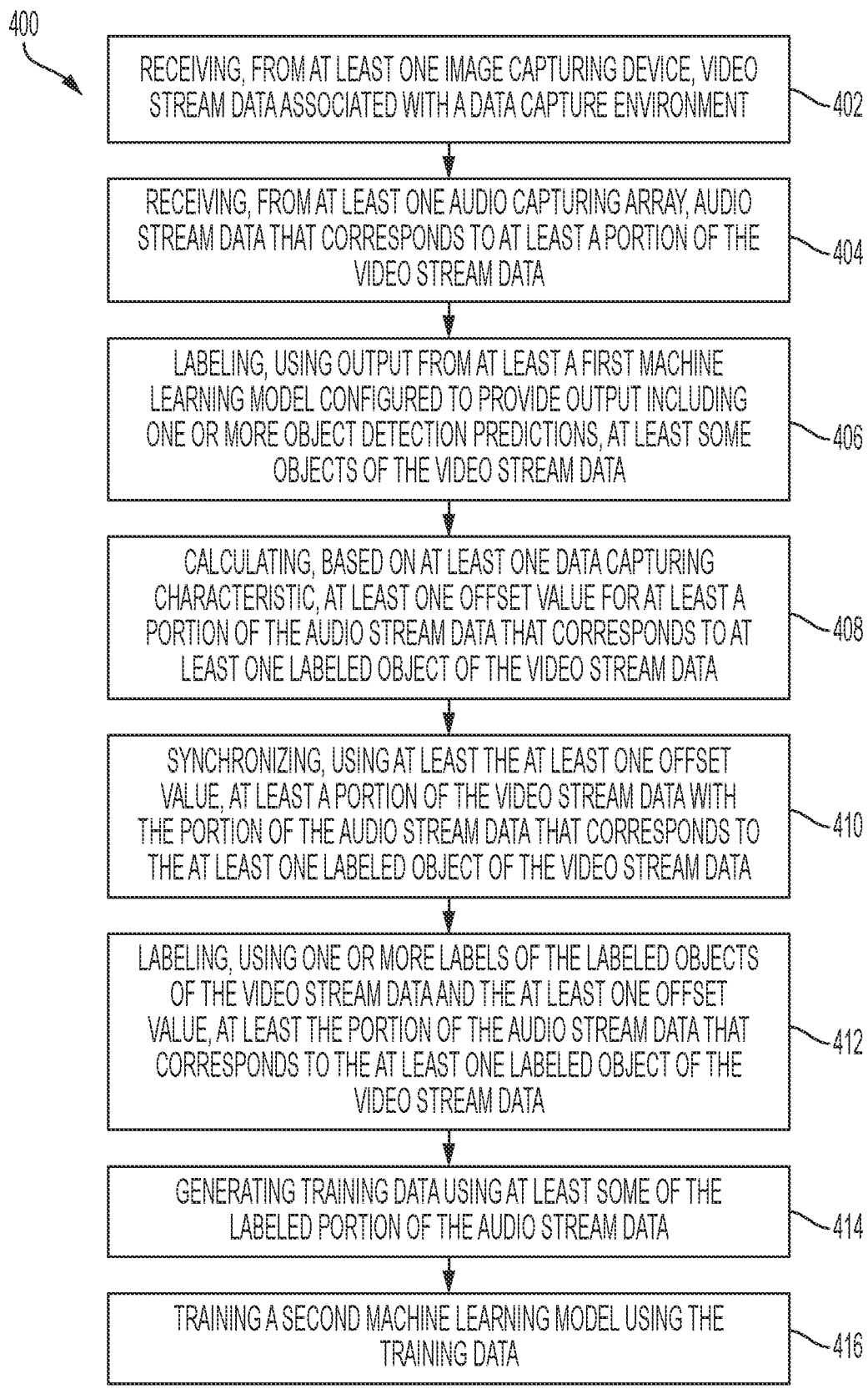
FIG. 4 is a flow diagram generally illustrating an audio data labeling method, according to the principles of the present disclosure.

FIG. 4 is a flow diagram generally illustrating an audio data labeling method 400 according to the principles of the present disclosure. At 402, the method 400 receives, from at least one image capturing device, video stream data associated with a data capture environment. For example, the system 202 may receive the video stream data from the image capturing device 302.

At 404, the method 400 receives, from at least one audio capturing array, audio stream data that corresponds to at least a portion of the video stream data. For example, the system 202 may receive the audio stream data from the audio capturing array 304.

At 406, the method 400 labels, using output from at least a first machine-learning model configured to provide output including one or more object detection predictions, at least some objects of the video stream data. For example, the system 202 may label, using output from the machine-learning model 210, at least some objects of the video stream data.

At 408, the method 400 calculates, based on at least one data capturing characteristic, at least one offset value for at least a portion of the audio stream data that corresponds to at least one labeled object of the video stream data. For example, the system 202 may calculate the at least one offset value.

At 410, the method 400 synchronizes, using at least the at least one offset value, at least a portion of the video stream data with the portion of the audio stream data that corresponds to the at least one labeled object of the video stream data. For example, the system 202 may synchronize, using at least the at least one offset value, at least a portion of the video stream data with the portion of the audio stream data that corresponds to the at least one labeled object of the video stream data.

At 412, the method 400 labels, using one or more labels of the labeled objects of the video stream data and the at least one offset value, at least the portion of the audio stream data that corresponds to the at least one labeled object of the video stream data. For example, the system 202 may label, using one or more labels of the labeled objects of the video stream data and the at least one offset value, at least the portion of the audio stream data that corresponds to the at least one labeled object of the video stream data.

At 414, the method 400 generates training data using at least some of the labeled portion of the audio stream data. For example, the system 202 may generate training data using at least some of the labeled portion of the audio stream data.

At 416, the method 400 trains a second machine-learning model using the training data. For example, the system 202 may train the second machine-learning model using the training data.

Figure 5:
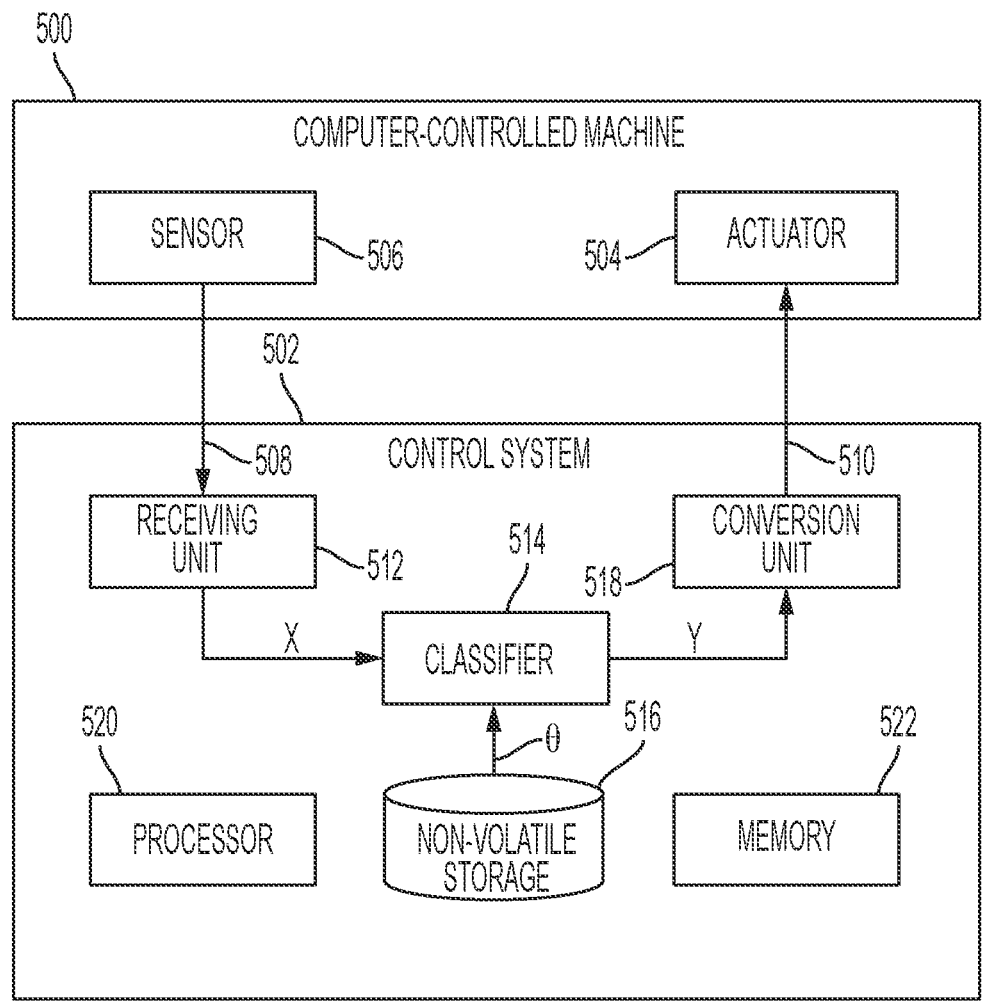
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
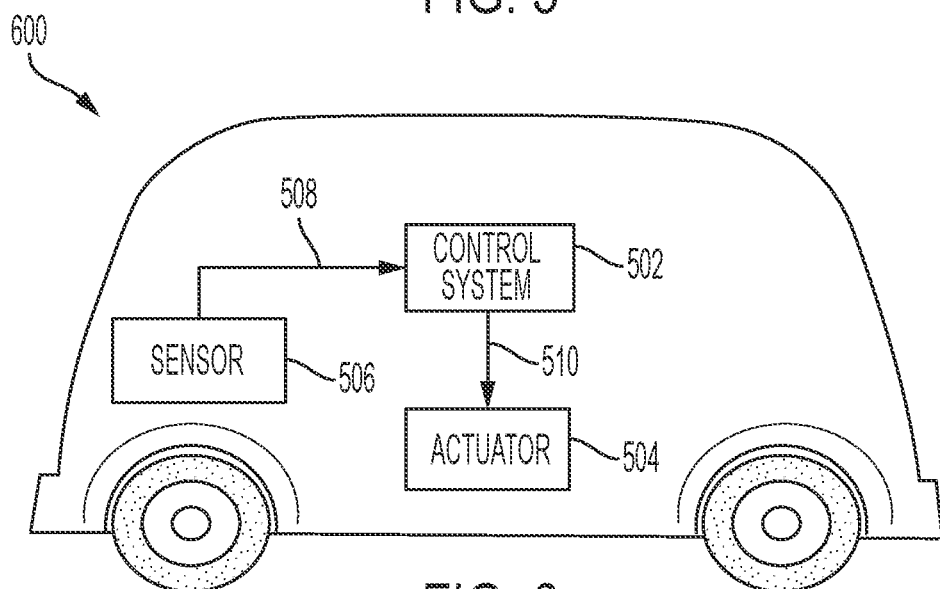
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
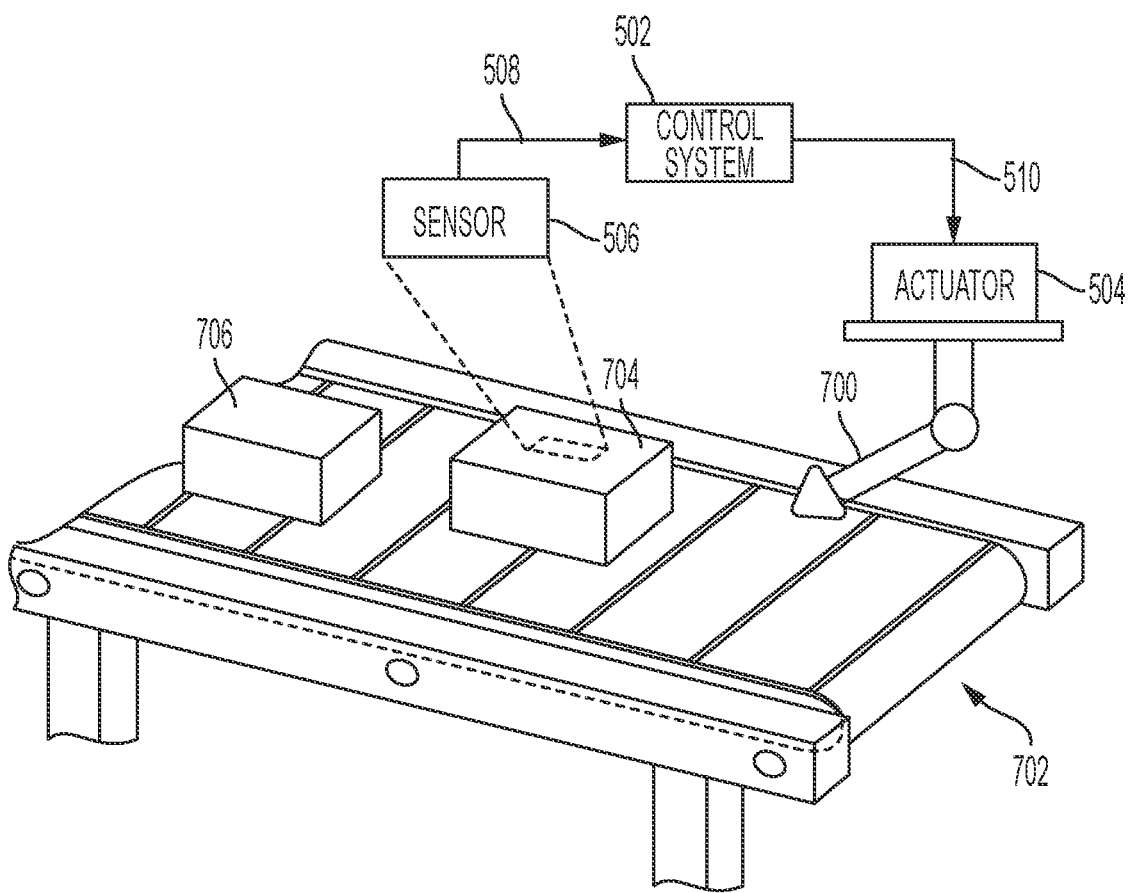
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
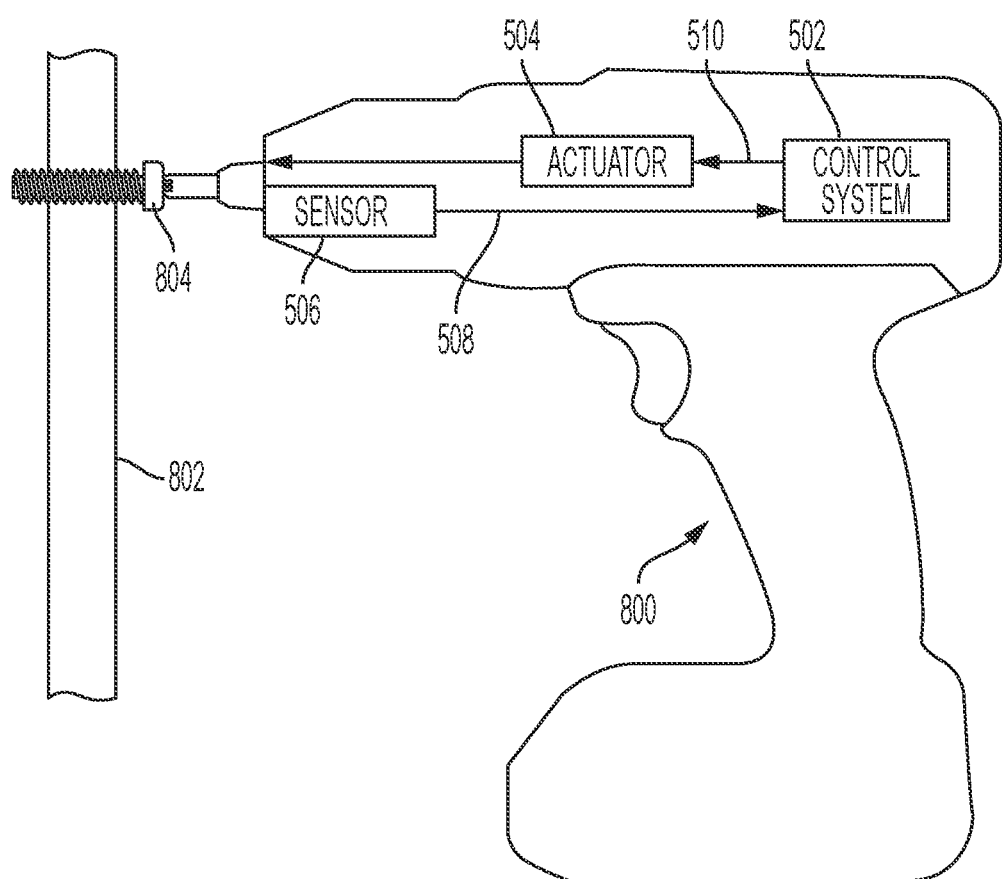
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
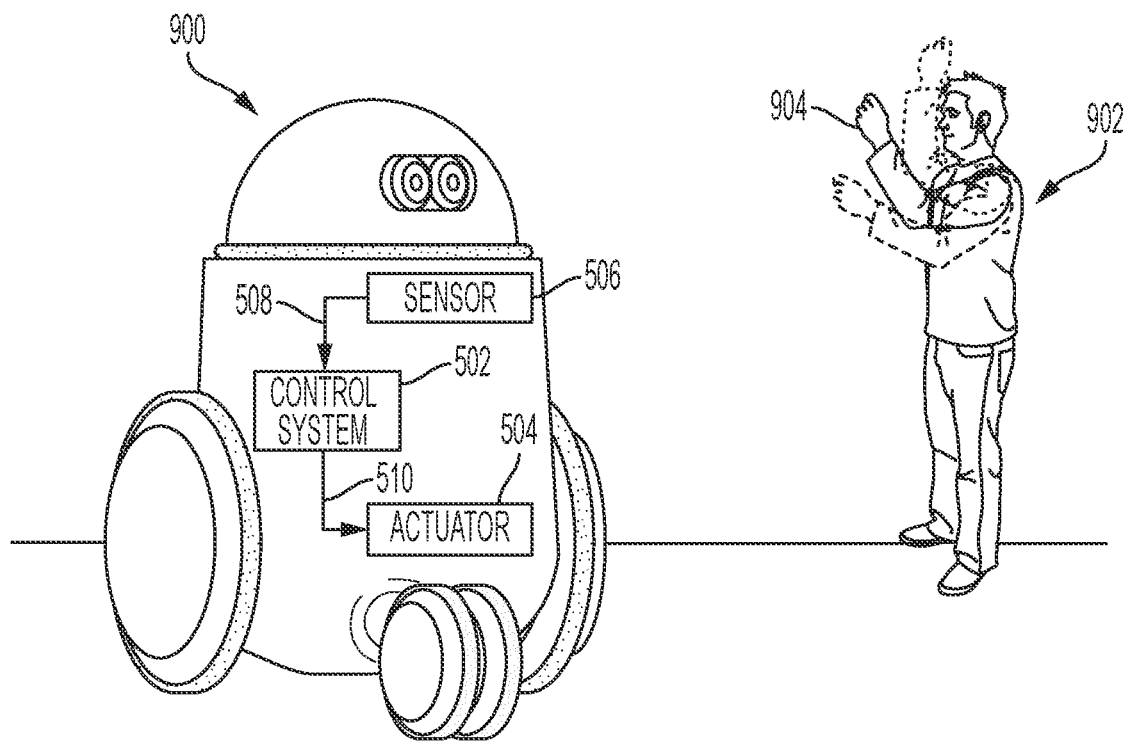
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
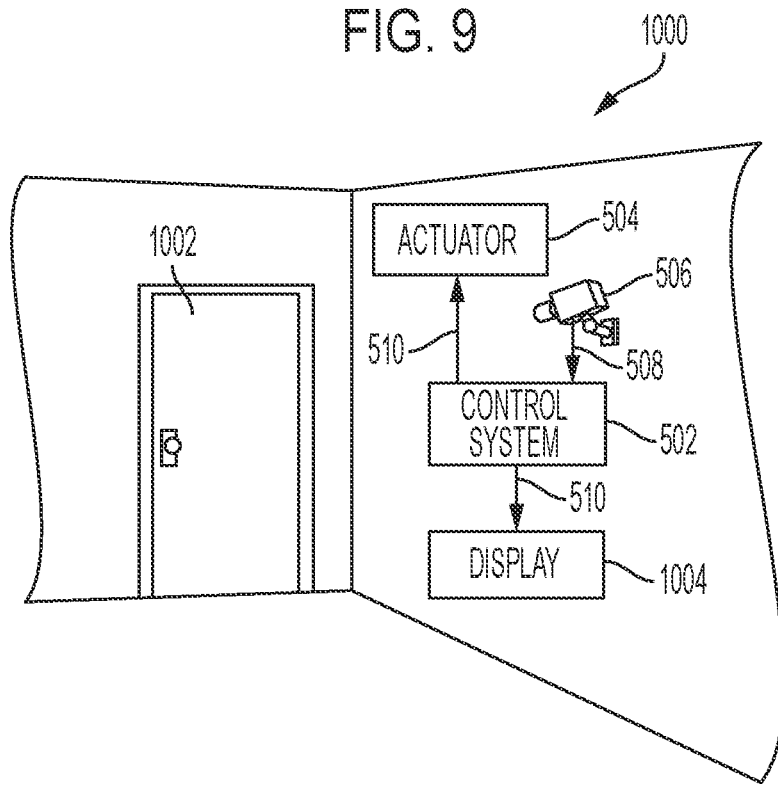
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
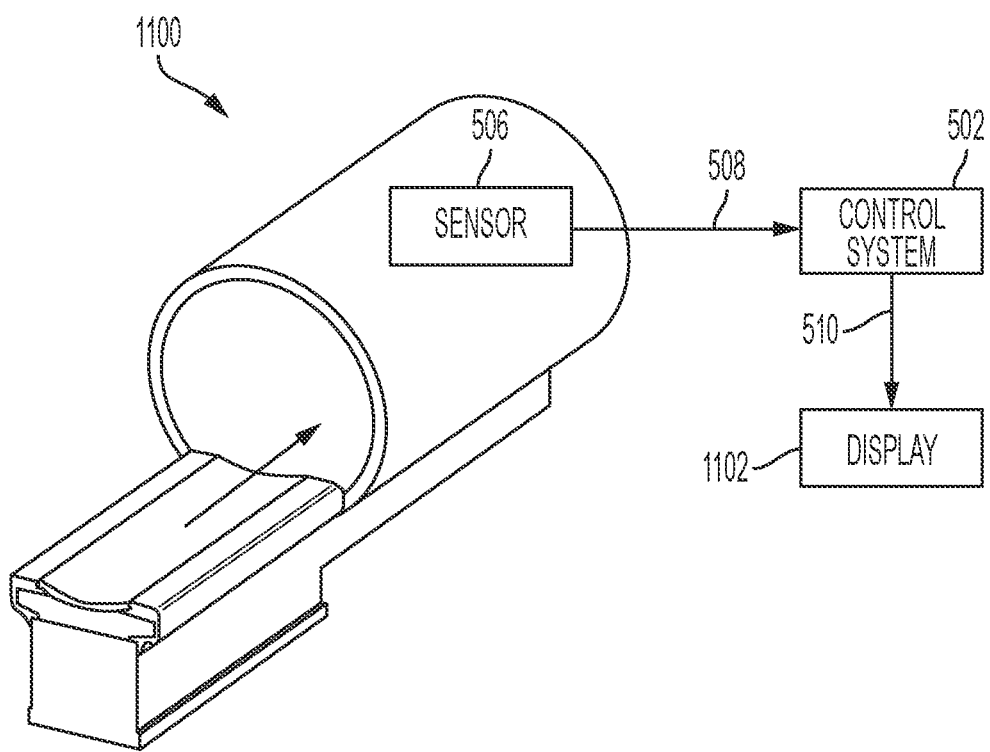
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments, a method for labeling audio data includes receiving, from at least one image capturing device, video stream data associated with a data capture environment. The method also includes receiving, from at least one audio capturing array, audio stream data that corresponds to at least a portion of the video stream data. The method also includes labeling, using output from at least a first machine-learning model configured to provide output including one or more object detection predictions, at least some objects of the video stream data. The method also includes calculating, based on at least one data capturing characteristic, at least one offset value for at least a portion of the audio stream data that corresponds to at least one labeled object of the video stream data and synchronizing, using at least the at least one offset value, at least a portion of the video stream data with the portion of the audio stream data that corresponds to the at least one labeled object of the video stream data. The method also includes labeling, using one or more labels of the labeled objects of the video stream data and the at least one offset value, at least the portion of the audio stream data that corresponds to the at least one labeled object of the video stream data. The method also includes generating training data using at least some of the labeled portion of the audio stream data and training a second machine-learning model using the training data.

In some embodiments, the at least one audio capturing array includes a plurality of audio capturing devices. In some embodiments, the at least one audio capturing array is remotely located from the at least one image capturing device. In some embodiments, labeling, using the output from at least the first machine-learning model, the at least some objects of the video stream data includes labeling the at least some objects of the video stream data with at least an event type, an event start indicator, and an event end indicator. In some embodiments, the at least one data capturing characteristic includes one or more characteristics of the at least one image capturing device. In some embodiments, the at least one data capturing characteristic includes one or more characteristics of the at least one audio capturing array. In some embodiments, the at least one data capturing characteristic includes one or more characteristics corresponding to a location of the at least one image capturing device relative to the at least one audio capturing array. In some embodiments, the at least one data capturing characteristic includes one or more characteristics corresponding to a movement of an object in the video stream data. In some embodiments, calculating, based on the at least one data capturing characteristic, the at least one offset value for the at least a portion of the audio stream data that corresponds to the at least one labeled object of the video stream data includes using at least one probabilistic-based function.

In some embodiments, a system for labeling audio data includes a processor and a memory. The memory includes instructions that, when executed by the processor, cause the processor to: receive, from at least one image capturing device, video stream data associated with a data capture environment; receive, from at least one audio capturing array, audio stream data that corresponds to at least a portion of the video stream data; label, using output from at least a first machine-learning model configured to provide output including one or more object detection predictions, at least some objects of the video stream data; calculate, based on at least one data capturing characteristic, at least one offset value for at least a portion of the audio stream data that corresponds to at least one labeled object of the video stream data; synchronize, using at least the at least one offset value, at least a portion of the video stream data with the portion of the audio stream data that corresponds to the at least one labeled object of the video stream data; label, using one or more labels of the labeled objects of the video stream data and the at least one offset value, at least the portion of the audio stream data that corresponds to the at least one labeled object of the video stream data; generate training data using at least some of the labeled portion of the audio stream data; train a second machine-learning model using the training data; and detect, using the second machine-learning model, one or more sound associated with audio data provided as input to the second machine-learning model.

In some embodiments, the at least one audio capturing array includes a plurality of audio capturing devices. In some embodiments, the at least one audio capturing array is remotely located from the at least one image capturing device. In some embodiments, the instructions further cause the processor to label, using the output from at least the first machine-learning model, the at least some objects of the video stream data by labeling the at least some objects of the video stream data with at least an event type, an event start indicator, and an event end indicator. In some embodiments, the at least one data capturing characteristic includes one or more characteristics of the at least one image capturing device. In some embodiments, the at least one data capturing characteristic includes one or more characteristics of the at least one audio capturing array. In some embodiments, the at least one data capturing characteristic includes one or more characteristics corresponding to a location of the at least one image capturing device relative to the at least one audio capturing array. In some embodiments, the at least one data capturing characteristic includes one or more characteristics corresponding to a movement of an object in the video stream data. In some embodiments, the instructions further cause the processor to calculate, based on the at least one data capturing characteristic, the at least one offset value for the at least a portion of the audio stream data that corresponds to the at least one labeled object of the video stream data by using at least one probabilistic-based function.

In some embodiments, an apparatus for labeling audio data includes a processor and a memory. The memory includes instructions that, when executed by the processor, cause the processor to: receive, from at least one image capturing device, video stream data associated with a data capture environment; receive, from at least one audio capturing array, audio stream data that corresponds to at least a portion of the video stream data; label, using output from at least a first machine-learning model configured to provide output including one or more object detection predictions, at least some objects of the video stream data with at least an event type, an event start indicator, and an event end indicator; calculate, based on at least one data capturing characteristic and using at least one probabilistic-based function, at least one offset value for at least a portion of the audio stream data that corresponds to at least one labeled object of the video stream data; synchronize, using at least the at least one offset value, at least a portion of the video stream data with the portion of the audio stream data that corresponds to the at least one labeled object of the video stream data; label, using one or more labels of the labeled objects of the video stream data and the at least one offset value, at least the portion of the audio stream data that corresponds to the at least one labeled object of the video stream data; generate training data using at least some of the labeled portion of the audio stream data; and train a second machine-learning model using the training data.

In some embodiments, the at least one audio capturing array includes a plurality of audio capturing devices, and wherein the plurality of audio capturing devices is remotely located from the at least one image capturing device.

In some embodiments, a method for generating training data includes receiving, audio stream data associated with at least one audio capturing array disposed in a data capture environment, receiving video stream data associated with the data capture environment contemporaneous with the audio stream data, the video stream data being associated with at least one image capturing array that is disposed in the data capture environment at a distance from the at least one audio capturing array, and identifying, using output from at least a first machine learning model configured to provide output including one or more object detection predictions, one or more objects in the video stream data. The method also includes, for at least one object of the one or more objects identified in the video stream data, identifying, using output form a probability-based audio event detector, a portion of the audio stream data that corresponds to the at least one object. The method also includes calculating, based on at least one data capturing characteristic, at least one offset value for at least a portion of the audio stream data that corresponds to at least one labeled object of the video stream data, and computing, for the at least one object, a shift value based on a cross-correlation between a portion of the video stream data that corresponds to the at least one object and the portion of the audio stream data corresponding the at least one object. The method also includes synchronizing, using at least the at least one offset value and the shift value, the portion of the video stream data that corresponds to the at least one objection with the portion of the audio stream data that corresponds to the at least one object and labeling at least the portion of the audio stream data that corresponds to the at least one object using one or more labels extracted for respective objects of the video stream data, the at least one offset value, and the shift value. The method also includes generating training data using at least one of the labeled portion of the audio stream data.

In some embodiments, the at least one audio capturing array includes a plurality of audio capturing devices. In some embodiments, the method also includes training an audio recognition machine learning model using the training data. The audio recognition machine learning model, having been trained using the training data, is configured to receive input including audio stream data, and detect one or more events in the input. In some embodiments, the probability-based audio event detector includes one of a Mel-Frequency Cepstral Coefficients feature extraction classifier and a logic regression classifier. In some embodiments, the at least one data capturing characteristic includes one or more characteristics of the at least one image capturing device. In some embodiments, the at least one data capturing characteristic includes one or more characteristics of the at least one audio capturing array. In some embodiments, the at least one data capturing characteristic includes one or more characteristics corresponding to a location of the at least one image capturing device relative to the at least one audio capturing array. In some embodiments, the at least one data capturing characteristic includes one or more characteristics corresponding to a movement of an object in the video stream data. In some embodiments, the at least one data capturing characteristic includes one or more probabilities of an event associated with at least one object of the video stream data occurring over a period.

In some embodiments, a system for training an audio recognition machine learning model includes a processor and a memory. The memory includes instructions that, when executed by the processor, cause the processor to: receive, audio stream data associated with at least one audio capturing array disposed in a data capture environment; receive video stream data associated with the data capture environment contemporaneous with the audio stream data, the video stream data being associated with at least one image capturing array that is disposed in the data capture environment at a distance from the at least one audio capturing array; identify, using output from at least a first machine learning model configured to provide output including one or more object detection predictions, one or more objects in the video stream data; for at least one object of the one or more objects identified in the video stream data, identify, using output form a probability-based audio event detector, a portion of the audio stream data that corresponds to the at least one object; calculate, based on at least one data capturing characteristic, at least one offset value for at least a portion of the audio stream data that corresponds to at least one labeled object of the video stream data; compute, for the at least one object, a shift value based on a cross-correlation between a portion of the video stream data that corresponds to the at least one object and the portion of the audio stream data corresponding the at least one object; synchronize, using at least the at least one offset value and the shift value, the portion of the video stream data that corresponds to the at least one objection with the portion of the audio stream data that corresponds to the at least one object; label at least the portion of the audio stream data that corresponds to the at least one object using one or more labels extracted for respective objects of the video stream data, the at least one offset value, and the shift value; generate training data using at least one of the labeled portion of the audio stream data; and train an audio recognition machine learning model using the training data.

In some embodiments, the at least one audio capturing array includes a plurality of audio capturing devices. In some embodiments, the audio recognition machine learning model, having been trained using the training data, is configured to receive input including audio stream data, and detect one or more events in the input. In some embodiments, the probability-based audio event detector includes one of a Mel-Frequency Cepstral Coefficients feature extraction classifier and a logic regression classifier. In some embodiments, the at least one data capturing characteristic includes one or more characteristics of the at least one image capturing device. In some embodiments, the at least one data capturing characteristic includes one or more characteristics of the at least one audio capturing array. In some embodiments, the at least one data capturing characteristic includes one or more characteristics corresponding to a location of the at least one image capturing device relative to the at least one audio capturing array. In some embodiments, the at least one data capturing characteristic includes one or more characteristics corresponding to a movement of an object in the video stream data. In some embodiments, the at least one data capturing characteristic includes one or more probabilities of an event associated with at least one object of the video stream data occurring over a period.

In some embodiments, an apparatus for training an audio recognition machine learning model includes a processor and a memory. The memory includes instructions that, when executed by the processor, cause the processor to: receive, audio stream data associated with at least one audio capturing device disposed in a data capture environment; receive video stream data associated with the data capture environment contemporaneous with the audio stream data, the video stream data being associated with at least one image capturing device that is disposed in the data capture environment at a distance from the at least one audio capturing device; identify, using output from at least a first machine learning model configured to provide output including one or more object detection predictions, one or more objects in the video stream data; for at least one object of the one or more objects identified in the video stream data, identify, using output form a probability-based audio event detector, a portion of the audio stream data that corresponds to the at least one object; calculate, based on at least one data capturing characteristic, at least one offset value for at least a portion of the audio stream data that corresponds to at least one labeled object of the video stream data; compute, for the at least one object, a shift value based on a cross-correlation between a portion of the video stream data that corresponds to the at least one object and the portion of the audio stream data corresponding the at least one object; synchronize, using at least the at least one offset value and the shift value, the portion of the video stream data that corresponds to the at least one objection with the portion of the audio stream data that corresponds to the at least one object; label at least the portion of the audio stream data that corresponds to the at least one object using one or more labels extracted for respective objects of the video stream data, the at least one offset value, and the shift value; generate training data using at least one of the labeled portion of the audio stream data; and train an audio recognition machine learning model using the training data, the audio recognition machine learning model, having been trained using the training data, being configured to detect one or more events in audio stream data provided as input to the audio recognition machine learning model.

In some embodiments, the at least one data capturing characteristic includes one or more probabilities of an event associated with at least one object of the video stream data occurring over a period.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for generating training data, the method comprising:
    receiving, audio stream data associated with at least one audio capturing array disposed in a data capture environment;
    receiving video stream data associated with the data capture environment contemporaneous with the audio stream data, the video stream data being associated with at least one image capturing array that is disposed in the data capture environment at a distance from the at least one audio capturing array;
    identifying, using output from at least a first machine learning model configured to provide output including one or more object detection predictions, one or more objects in the video stream data;
    for at least one object of the one or more objects identified in the video stream data, identifying, using output from a probability-based audio event detector, a portion of the audio stream data that corresponds to the at least one object;
    calculating, based on at least one data capturing characteristic, at least one offset value for at least a portion of the audio stream data that corresponds to at least one labeled object of the video stream data;
    computing, for the at least one object, a shift value based on a cross-correlation between a portion of the video stream data that corresponds to the at least one object and the portion of the audio stream data corresponding the at least one object;
    synchronizing, using at least the at least one offset value and the shift value, the portion of the video stream data that corresponds to the at least one objection with the portion of the audio stream data that corresponds to the at least one object;
    labeling at least the portion of the audio stream data that corresponds to the at least one object using one or more labels extracted for respective objects of the video stream data, the at least one offset value, and the shift value; and
    generating training data using at least one of the labeled portion of the audio stream data.

2. The method of claim 1, wherein the at least one audio capturing array includes a plurality of audio capturing devices.

3. The method of claim 1, further comprising training an audio recognition machine learning model using the training data, wherein the audio recognition machine learning model, having been trained using the training data, is configured to:
    receive input including audio stream data; and
    detect one or more events in the input.

4. The method of claim 1, wherein the probability-based audio event detector includes one of a Mel-Frequency Cepstral Coefficients feature extraction classifier and a logic regression classifier.

5. The method of claim 1, wherein the at least one data capturing characteristic includes one or more characteristics of the at least one image capturing device.

6. The method of claim 1, wherein the at least one data capturing characteristic includes one or more characteristics of the at least one audio capturing array.

7. The method of claim 1, wherein the at least one data capturing characteristic includes one or more characteristics corresponding to a location of the at least one image capturing device relative to the at least one audio capturing array.

8. The method of claim 1, wherein the at least one data capturing characteristic includes one or more characteristics corresponding to a movement of an object in the video stream data.

9. The method of claim 1, wherein the at least one data capturing characteristic includes one or more probabilities of an event associated with at least one object of the video stream data occurring over a period.

10. A system for training an audio recognition machine learning model, the system comprising:
    a processor; and
    a memory including instructions that, when executed by the processor, cause the processor to:
        receive, audio stream data associated with at least one audio capturing array disposed in a data capture environment;
        receive video stream data associated with the data capture environment contemporaneous with the audio stream data, the video stream data being associated with at least one image capturing array that is disposed in the data capture environment at a distance from the at least one audio capturing array;
        identify, using output from at least a first machine learning model configured to provide output including one or more object detection predictions, one or more objects in the video stream data;
        for at least one object of the one or more objects identified in the video stream data, identify, using output from a probability-based audio event detector, a portion of the audio stream data that corresponds to the at least one object;
        calculate, based on at least one data capturing characteristic, at least one offset value for at least a portion of the audio stream data that corresponds to at least one labeled object of the video stream data;

compute, for the at least one object, a shift value based on a cross-correlation between a portion of the video stream data that corresponds to the at least one object and the portion of the audio stream data corresponding the at least one object;

synchronize, using at least the at least one offset value and the shift value, the portion of the video stream data that corresponds to the at least one objection with the portion of the audio stream data that corresponds to the at least one object;

label at least the portion of the audio stream data that corresponds to the at least one object using one or more labels extracted for respective objects of the video stream data, the at least one offset value, and the shift value;

generate training data using at least one of the labeled portion of the audio stream data; and train an audio recognition machine learning model using the training data.

11. The system of claim 10, wherein the at least one audio capturing array includes a plurality of audio capturing devices.

12. The system of claim 10, wherein the audio recognition machine learning model, having been trained using the training data, is configured to:
receive input including audio stream data; and
detect one or more events in the input.

13. The system of claim 10, wherein the probability-based audio event detector includes one of a Mel-Frequency Cepstral Coefficients feature extraction classifier and a logic regression classifier.

14. The system of claim 10, wherein the at least one data capturing characteristic includes one or more characteristics of the at least one image capturing device.

15. The system of claim 10, wherein the at least one data capturing characteristic includes one or more characteristics of the at least one audio capturing array.

16. The system of claim 10, wherein the at least one data capturing characteristic includes one or more characteristics corresponding to a location of the at least one image capturing device relative to the at least one audio capturing array.

17. The system of claim 10, wherein the at least one data capturing characteristic includes one or more characteristics corresponding to a movement of an object in the video stream data.

18. The system of claim 10, wherein the at least one data capturing characteristic includes one or more probabilities of an event associated with at least one object of the video stream data occurring over a period.

19. An apparatus for training an audio recognition machine learning model, the apparatus comprising:
a processor; and
a memory including instructions that, when executed by the processor, cause the processor to:
receive, audio stream data associated with at least one audio capturing device disposed in a data capture environment;

receive video stream data associated with the data capture environment contemporaneous with the audio stream data, the video stream data being associated with at least one image capturing device that is disposed in the data capture environment at a distance from the at least one audio capturing device;

identify, using output from at least a first machine learning model configured to provide output including one or more object detection predictions, one or more objects in the video stream data;

for at least one object of the one or more objects identified in the video stream data, identify, using output from a probability-based audio event detector, a portion of the audio stream data that corresponds to the at least one object;

calculate, based on at least one data capturing characteristic, at least one offset value for at least a portion of the audio stream data that corresponds to at least one labeled object of the video stream data;

compute, for the at least one object, a shift value based on a cross-correlation between a portion of the video stream data that corresponds to the at least one object and the portion of the audio stream data corresponding the at least one object;

synchronize, using at least the at least one offset value and the shift value, the portion of the video stream data that corresponds to the at least one objection with the portion of the audio stream data that corresponds to the at least one object;

label at least the portion of the audio stream data that corresponds to the at least one object using one or more labels extracted for respective objects of the video stream data, the at least one offset value, and the shift value;

generate training data using at least one of the labeled portion of the audio stream data; and train an audio recognition machine learning model using the training data, the audio recognition machine learning model, having been trained using the training data, being configured to detect one or more events in audio stream data provided as input to the audio recognition machine learning model.

20. The apparatus of claim 19, wherein the at least one data capturing characteristic includes one or more probabilities of an event associated with at least one object of the video stream data occurring over a period.

* * * * *